US010021605B2

United States Patent
Dong et al.

(10) Patent No.: US 10,021,605 B2
(45) Date of Patent: Jul. 10, 2018

(54) NON-INTERRUPTED HANDOFF OF REAL-TIME NETWORK-DISTRIBUTED SERVICES

(71) Applicant: Uber Technologies, Inc., San Francisco, CA (US)

(72) Inventors: Xiaoman Dong, Colma, CA (US); Shuyi Chen, Fremont, CA (US); Sudhir Tonse, Fremont, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 267 days.

(21) Appl. No.: 14/995,121

(22) Filed: Jan. 13, 2016

(65) Prior Publication Data

US 2017/0201914 A1     Jul. 13, 2017

(51) Int. Cl.
| | |
|---|---|
| *H04W 4/00* | (2018.01) |
| *H04W 36/00* | (2009.01) |
| *H04L 12/26* | (2006.01) |

(52) U.S. Cl.
CPC ....... *H04W 36/0083* (2013.01); *H04L 43/106* (2013.01)

(58) Field of Classification Search
CPC . H04W 36/0083; H04W 36/32; H04W 48/10; H04W 12/06; H04W 4/06; H04W 4/18; H04W 48/16; H04W 76/02; H04W 4/02; H04W 40/20; H04L 43/106; H04L 12/26; H04L 63/08; H04L 29/08729; H04L 63/10; H04L 67/2842; H04L 67/12; H04L 41/0816; H04L 67/104

See application file for complete search history.

(56) References Cited

U.S. PATENT DOCUMENTS

| | | | |
|---|---|---|---|
| 8,937,903 B2* | 1/2015 | Bari | H04L 63/08 370/328 |
| 2006/0075076 A1* | 4/2006 | Sinha | G06F 8/67 709/220 |

* cited by examiner

*Primary Examiner* — Candal Elpenord
*Assistant Examiner* — Hardikkumar Patel
(74) *Attorney, Agent, or Firm* — Fenwick & West LLP (57) ABSTRACT

A real-time service is distributed across multiple hosts, with different instances of the service running on the different hosts. Instances of a current (non-updated) version of a service run concurrently with instances of an updated version of the same service for some period of time. In order to smoothly handoff the handling of client requests so as to handle all packets, the different instances of the service evaluate one or more criteria that include a listed data timestamp of packets embodying the client requests. Use of objective criteria such as the listed data timestamp allow the different service instances to evaluate the criteria in a way that is consistent with the evaluations of the other instances, despite computer network-induced variability such as imperfect clock synchronization among hosts and variance in request delivery time.

20 Claims, 6 Drawing Sheets

Host A 400A

| "Real Realtime" World Clock | Server Clock | Data Packets timestamp | latitude | longitude | user_id | variance (delay) (sec) | Service instance 402A Switching "t" | Processing |
|---|---|---|---|---|---|---|---|---|
| 1 1:00:08 AM | 1:00:08 AM t1 | 1:00:02 AM | 11.332346 | 45.000326 | 1 | 6 | 1:00:16 AM | TRUE |
| 2 1:00:09 AM | 1:00:09 AM | 1:00:03 AM | 11.332351 | 45.000325 | 2 | 6 | 1:00:16 AM | TRUE |
| 3 1:00:10 AM | 1:00:10 AM | 1:00:09 AM | 11.332356 | 45.000324 | 1 | 1 | 1:00:16 AM | TRUE |
| 4 1:00:11 AM | 1:00:11 AM | 1:00:08 AM | 11.332361 | 45.000323 | 2 | 3 | 1:00:16 AM | TRUE |
| 5 1:00:12 AM | 1:00:12 AM | 1:00:06 AM | 11.332366 | 45.000322 | 1 | 6 | 1:00:16 AM | TRUE |
| 6 1:00:13 AM | 1:00:13 AM | 1:00:10 AM | 11.332371 | 45.000321 | 2 | 3 | 1:00:16 AM | TRUE |
| 7 1:00:14 AM | 1:00:14 AM | 1:00:14 AM | 11.332376 | 45.0032 | 1 | 0 | 1:00:16 AM | TRUE |
| 8 1:00:15 AM | 1:00:15 AM | 1:00:12 AM | 11.332381 | 45.000319 | 2 | 3 | 1:00:16 AM | TRUE |
| 9 | | 1:00:10 AM | 11.332386 | 45.000318 | 1 | 6 | 1:00:16 AM | TRUE |
| 10 1:00:17 AM | 1:00:17 AM | 1:00:17 AM | 11.332391 | 45.000317 | 2 | 0 | 1:00:16 AM | FALSE |
| 11 1:00:18 AM | 1:00:18 AM | 1:00:16 AM | 11.332396 | 45.000316 | 1 | 2 | 1:00:16 AM | FALSE |
| 12 1:00:19 AM | 1:00:19 AM | 1:00:14 AM | 11.332401 | 45.000315 | 2 | 5 | 1:00:16 AM | TRUE |
| 13 1:00:20 AM | 1:00:20 AM | 1:00:17 AM | 11.332406 | 45.000314 | 1 | 3 | 1:00:16 AM | FALSE |
| 14 1:00:21 AM | 1:00:21 AM | 1:00:16 AM | 11.332411 | 45.000313 | 2 | 5 | 1:00:16 AM | TRUE |
| 15 1:00:21 AM | 1:00:21 AM | 1:00:15 AM | 11.332416 | 45.000312 | 1 | 6 | 1:00:16 AM | TRUE |
| 16 1:00:23 AM | 1:00:23 AM | 1:00:19 AM | 11.332421 | 45.000311 | 2 | 4 | 1:00:16 AM | FALSE |
| 17 1:00:24 AM | 1:00:24 AM | 1:00:11 AM | 11.332426 | 45.0031 | 1 | 3 | 1:00:16 AM | FALSE |
| 18 1:00:24 AM | 1:00:24 AM | 1:00:18 AM | 11.332431 | 45.000309 | 2 | 6 | 1:00:16 AM | FALSE |
| 19 1:00:26 AM | 1:00:26 AM | 1:00:22 AM | 11.332436 | 45.000308 | 1 | 4 | 1:00:16 AM | FALSE |
| 20 1:00:27 AM | 1:00:27 AM | 1:00:23 AM | 11.332441 | 45.000307 | 2 | 4 | 1:00:16 AM | FALSE |
| 21 1:00:28 AM | 1:00:28 AM | 1:00:25 AM | 11.332446 | 45.000306 | 1 | 3 | 1:00:16 AM | FALSE |
| 22 1:00:29 AM | 1:00:29 AM | 1:00:26 AM | 11.332451 | 45.000305 | 2 | 3 | 1:00:16 AM | FALSE |
| 23 1:00:30 AM | 1:00:30 AM | 1:00:28 AM | 11.332456 | 45.000304 | 1 | 2 | 1:00:16 AM | FALSE |
| 24 1:00:30 AM | 1:00:30 AM | 1:00:24 AM | 11.332461 | 45.000303 | 2 | 6 | 1:00:16 AM | FALSE |
| 25 1:00:32 AM | 1:00:32 AM | 1:00:27 AM | 11.332466 | 45.000302 | 1 | 5 | 1:00:16 AM | FALSE |
| 26 1:00:33 AM | 1:00:33 AM | 1:00:30 AM | 11.332471 | 45.000301 | 2 | 3 | 1:00:16 AM | FALSE |
| 27 1:00:34 AM | 1:00:34 AM | 1:00:31 AM | 11.332476 | 45.0003 | 2 | 3 | 1:00:16 AM | FALSE |
| 28 1:00:35 AM | 1:00:35 AM t2 | 1:00:33 AM | 11.332481 | 45.000299 | 1 | 2 | 1:00:16 AM | FALSE |

*FIG. 4A*

| FIG. 4A | FIG. 4B |
|---|---|

*FIG. 4*

Host B 400B

| Server Clock | Data Packets | | | | variance (delay, sec) | Service instance 402B | |
|---|---|---|---|---|---|---|---|
| | timestamp | latitude | longitude | user id | | timestamp | Processing |
| 1 | 1:00:08 AM (Server B is always 1 second late in reading) | | | | | | |
| 2 | 1:00:09 AM | 1:00:02 AM | 11.332346 | 45.00326 | 1 | 2 | 1:00:16 AM | FALSE |
| 3 | 1:00:10 AM | 1:00:03 AM | 11.332351 | 45.00325 | 2 | 2 | 1:00:16 AM | FALSE |
| 4 | 1:00:11 AM | 1:00:05 AM | 11.332356 | 45.00324 | 1 | 4 | 1:00:16 AM | FALSE |
| 5 | 1:00:12 AM | 1:00:08 AM | 11.332361 | 45.00323 | 2 | 7 | 1:00:16 AM | FALSE |
| 6 | 1:00:13 AM | 1:00:06 AM | 11.332366 | 45.00322 | 1 | 4 | 1:00:16 AM | FALSE |
| 7 | 1:00:14 AM | 1:00:10 AM | 11.332371 | 45.00321 | 2 | 1 | 1:00:16 AM | FALSE |
| 8 | 1:00:15 AM | 1:00:14 AM | 11.332376 | 45.0032 | 1 | 4 | 1:00:16 AM | FALSE |
| 9 | 1:00:17 AM | 1:00:12 AM | 11.332381 | 45.00319 | 2 | 7 | 1:00:16 AM | FALSE |
| 10 | 1:00:18 AM | 1:00:10 AM | 11.332386 | 45.00318 | 2 | 1 | 1:00:16 AM | FALSE |
| 11 | 1:00:19 AM | 1:00:17 AM | 11.332391 | 45.00317 | 1 | 3 | 1:00:16 AM | TRUE |
| 12 | 1:00:20 AM | 1:00:16 AM | 11.332396 | 45.00316 | 2 | 6 | 1:00:16 AM | TRUE |
| 13 | 1:00:21 AM | 1:00:14 AM | 11.332401 | 45.00315 | 1 | 4 | 1:00:16 AM | FALSE |
| 14 | 1:00:22 AM | 1:00:17 AM | 11.332406 | 45.00314 | 2 | 6 | 1:00:16 AM | TRUE |
| 15 | 1:00:23 AM | 1:00:16 AM | 11.332411 | 45.00313 | 1 | 7 | 1:00:16 AM | TRUE |
| 16 | 1:00:24 AM | 1:00:15 AM | 11.332416 | 45.00312 | 2 | 5 | 1:00:16 AM | FALSE |
| 17 | 1:00:25 AM | 1:00:19 AM | 11.332421 | 45.00311 | 1 | 4 | 1:00:16 AM | TRUE |
| 18 | 1:00:26 AM | 1:00:11 AM | 11.332426 | 45.0031 | 2 | 7 | 1:00:16 AM | FALSE |
| 19 | 1:00:27 AM | 1:00:18 AM | 11.332431 | 45.00309 | 1 | 5 | 1:00:16 AM | TRUE |
| 20 | 1:00:28 AM | 1:00:22 AM | 11.332436 | 45.00308 | 2 | 5 | 1:00:16 AM | TRUE |
| 21 | 1:00:29 AM | 1:00:23 AM | 11.332441 | 45.00307 | 1 | 4 | 1:00:16 AM | TRUE |
| 22 | 1:00:30 AM | 1:00:25 AM | 11.332446 | 45.00306 | 1 | 4 | 1:00:16 AM | TRUE |
| 23 | 1:00:30 AM | 1:00:26 AM | 11.332451 | 45.00305 | 1 | 3 | 1:00:16 AM | TRUE |
| 24 | 1:00:32 AM | 1:00:24 AM | 11.332456 | 45.00304 | 2 | 7 | 1:00:16 AM | TRUE |
| 25 | 1:00:33 AM | 1:00:27 AM | 11.332461 | 45.00303 | 2 | 6 | 1:00:16 AM | TRUE |
| 26 | 1:00:34 AM | 1:00:30 AM | 11.332466 | 45.00302 | 2 | 4 | 1:00:16 AM | TRUE |
| 27 | 1:00:35 AM | 1:00:31 AM | 11.332471 | 45.00301 | 2 | 4 | 1:00:16 AM | TRUE |
| 28 | 1:00:35 AM | 1:00:31 AM | 11.332476 | 45.003 | 2 | 3 | 1:00:16 AM | TRUE |
| 29 | 1:00:36 AM | 1:00:33 AM | 11.332481 | 45.00299 | 1 | 4 | 1:00:16 AM | TRUE |

NON-INTERRUPTED HANDOFF OF REAL-TIME NETWORK-DISTRIBUTED SERVICES

FIELD OF ART

The present invention generally relates to the field of real-time network-distributed services, and more specifically, to handling handoffs between instances of network-distributed (e.g., Internet-distributed) services so as to preserve continuous real-time processing in the presence of network-based factors such as imperfect clock synchronization and variable delivery times.

BACKGROUND

The conventional approach to updating real-time services is to stop the existing services and then to start the updated versions thereof. This may be a particularly slow process in the case of network-distributed services that are hosted on multiple hosts, all of which may need to be updated and synchronized before the service becomes ready to handle client requests.

The delay in stopping the existing distributed services, and the further delay in starting the updated services, leads to downtime of the service. This downtime causes delays in processing of packets intended for the service, which may be unacceptable for a real-time service, which may be intended to satisfy a request within several seconds, a second, or even a fraction of a second. For example, a particular real-time high-frequency stock trading service might be intended to satisfy a buy or sell request within one or two seconds. If the stock trading service is updated, requiring stopping the existing processes implementing the service and starting the updated processes and thereby causing a delay of several minutes, large numbers of trade requests will fail to be fulfilled in the interim, possibly leading to customer dissatisfaction and/or large losses of revenue.

SUMMARY

A real-time service is distributed across multiple hosts, with different instances of the service running on the different hosts. Instances of a current (non-updated) version of a service run concurrently with instances of an updated version of the same service for some period of time. In order to smoothly hand off the handling of client requests so as to handle all packets without downtime even in the presence of a service upgrade, the different instances of the service evaluate one or more criteria that include a listed data timestamp of packets embodying the client requests. Use of objective criteria such as the listed data timestamp allow the different service instances to evaluate the criteria in a way that is consistent with the evaluations of the other instances, despite computer network-induced variability such as imperfect clock synchronization among hosts and variance in request delivery time.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 4 (divided between FIGS. 4A and 4B) illustrates data for one specific example, in which a real-time transportation location update service receives client requests to log the current trip location.

The figures depict various embodiments for purposes of illustration only. One skilled in the art will readily recognize from the following description that alternative embodiments of the structures and methods illustrated herein may be employed without departing from the examples described herein.

DETAILED DESCRIPTION

Figure 1:
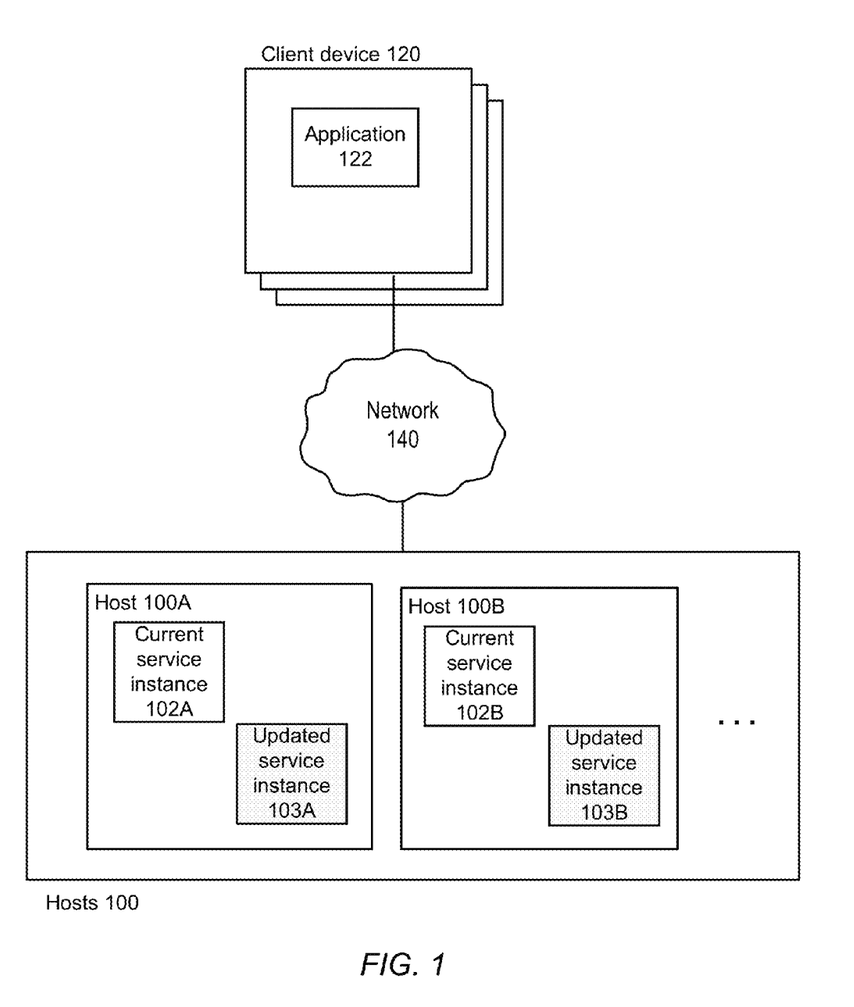
FIG. 1 illustrates a computing environment in which a set of hosts provide a service to clients over a network, according to one embodiment

FIG. 1 illustrates a computing environment in which a set of hosts provide a service to clients over a network 140, according to one embodiment.

In one embodiment, the service provided by the hosts is a distributed, real-time, data-processing service acting on streams. In some examples, a service, as described herein, can be implemented through execution of software code on one or more computing systems (or host systems). The service receives a data input and then performs processing based on the input. Some example services are responding to HTTP requests in response to a GET request, performing stock pricing and trading in response to a trade request, and decoding received TCP/IP packets.

The service illustrated in the example of FIG. 1 is distributed, in that multiple instances of the same service are running on different hosts 100, e.g., in order to provide sufficient availability to concurrently service the requests of many client devices 120. The different service instances may run the same version of the software code for the service, or they may run different versions. The services in aggregate may decide which service should process a given data input by a rule agreed upon by all the service instances.

The service may be a real-time service, where it is critical that the service be able to respond to client requests within some period of time appropriate for the service, such as two seconds for a real-time stock trading service, or ten seconds for a real-time transportation location update service in a transportation network.

A service that acts on a stream takes data input in the form of data packets that share the same data format and have an associated data timestamp that indicates a time that the data packet's data were produced. For example, a sample data packet of a stock exchange service might have the following data:

```
{
    timestamp: "2015-12-20T14:30:32.413",
    symbol: "FB",
    price: 200.00,
    volume: 1300
}
```

For real-time service, the timestamp (Ts) of a data packet lags behind the real-world time clock (T) when it is processed. The difference between T and Ts is referred as "real-time delay" of the data packet. It is common for the timestamps of data packets received by a real-time stream processing service to lack a strict temporal order. This may be due to imperfect clock synchronization on the systems on which the data packets were produced, or to the different packets being routed differently across the Internet or other computer network.

Still using the example of previous stock exchange data packet, the timestamp Ts is "2015-12-20T14:30:32.413"; when the data packet is processed by the stock exchange program, the real-world clock might already be "2015-12-20T14:30:32.913" (a half-second later). The "real-time delay" in this example is 0.5 seconds.

Real-time services typically have a "maximum-real-time-delay", such that if real-time data packet arrives later than that maximum delay value after it was sent, it will be out of date and no longer worth processing. For instance, referring again to the previous stock exchange example, if the stock exchange information arrived 5 minutes late, it would likely be pointless to make stock trading decisions based on that information.

Each host 100 may be a dedicated physical computing system (e.g., a server), or a virtual machine running on a physical computing system, and has an operating system on which a service instance executes.

The client devices 120 are computing devices capable of accessing the service over a network 140, such as desktop computers, laptop computers, tablet computers, smartphones, and the like. The client devices 120 run applications 122 that can access the service, such as general-purpose applications like web browsers, or custom applications specifically written to access the service.

The network 140 may be any suitable communications network(s) for data transmission. In an embodiment such as that illustrated in FIG. 1, the network 140 uses standard communications technologies and/or protocols and can include the Internet. In another embodiment, the entities use custom and/or dedicated data communications technologies.

In an example described through the majority of the remainder of the specification, initially the hosts 100 are running instances 102 of a current version of the service. At some later point, the service may need to be updated (e.g., to fix bugs, improve performance, or add new features), and the hosts will accordingly begin running instances 103 of an updated version. The updated version is different from the current version in that it changes the operation of the service in some way, such as changing the service code to improve efficiency, provide additional functionality, or the like. (The term "service" herein is understood to refer both to the current service instances 102 and to the updated service instances 103, given that they represent different versions of the same service.) Due to current computer architectures, upgrading a service typically entails stopping the service instances corresponding to the old version of the code, loading instances for the new version of the code, and then running the instances. However, simply stopping the current instances 102 and starting the updated instances 103 could fail to maintain the desired degree of real-time processing for which the service is designed, since shutting down the current instances 102 and starting the updated instances 103 could be time-consuming, particularly where many instances running on many hosts are involved and may need to be coordinated. For example, one particular service distributed across 30 hosts might take 4 minutes to start and have its instances coordinated, prior to being ready to handle client requests.

Accordingly, the current instances 102 and updated instances 103 are run concurrently on the hosts 100 for some period of time, during which time both the instances of the current version and the instances of the updated version are available to handle client requests. In order to determine whether to handle a client request, or to leave it for handling by the instances of the other version, both the current instances 102 of the current version and the updated instances 103 of the updated version refer to a common time at which the current instances 102 will stop handling client requests and the updated instances 103 will start handling the requests. However, the different hosts 100 on which the service instances are running may have imperfectly synchronized clocks, and hence there may not be a single reliable clock value known to all the service instances. Accordingly, rather than requiring a universally-known global time, the instances calculate times with respect to the data timestamp listed in the request packets received from the client devices. Since the data timestamp of a packet as specified by the client is a constant across recipient hosts 100, all the instances will have access to the same value, regardless of the clock times of the hosts 100 on which the instances are executing. The current instances 102 then process a given client request if it has a listed packet data timestamp before (or at) the "handoff" time, and the updated instances 103 process the client if it has a listed packet data timestamp after (or at) the handoff time.

Since the criterion for the handoff between the current instances 102 and the updated instances 103 is thus the data timestamp as specified in the client request packets, rather than a "true" universal time, the current instances 102 and updated instances 103 must both remain available for some period to service requests with appropriate data timestamps. Since packet data timestamps may vary across computer networks—e.g., due to IP packets potentially taking different routes across the Internet—client request packets with different listed data timestamps may arrive at the hosts 100 at the same time. For example, if the current instances 102 and the updated instances 103 are comparing the listed request packet data timestamps to a handoff time of t milliseconds (for some integer t), a packet with a listed data timestamp of t−1 might arrive at the hosts 100 at the same time as another packet with a listed data timestamp of t+1; the former packet should be handled by the current instances 102, and the latter packet should be handled by the updated instances 103, even though the two packets arrived at the host 100 at the same time.

Accordingly, since packets may arrive at different times, with some packets that have a data timestamp before the handoff time t (and hence to be processed by the current instances 102) arriving considerably after t, the current instances 102 should not immediately stop handling client requests at time t, but rather should continue to handle client requests for some time period after t, to account for "straggler" requests that arrive later than expected due to variability in network delivery times. Thus, in addition to the current instances 102 and the updated instances 103 both referring to a handoff time t (that is evaluated with respect to the request packet listed data timestamps), the current instances 102 continue to run until some later time $t_2$, at which point the current instances 102 are stopped and no longer handle client requests. The stopping time $t_2$ may be determined in different ways (as later described in more detail below with respect to a configuration determination module 208), and should be sufficiently long after the handoff time t that it is highly improbable that any packets with a listed data timestamp before the handoff time t will arrive after the current instances 102 have been stopped. For example, in one embodiment the time difference $|t_2-t|$ is set to be at least as long as the variance in packet transmission times.

Note that the fact that the current service instances 102 and the updated service instances 103 run concurrently, deciding for themselves whether to handle a given client request, means that there is no need for a separate component, such as a load balancer, to route a given request to the proper service instance 102. (The need for a separate load balancer would introduce additional complications, such as rendering the entire service unavailable when the load balancer itself is stopped for updating.) This represents an improvement to the functioning of the hosts 100.

Figure 2:
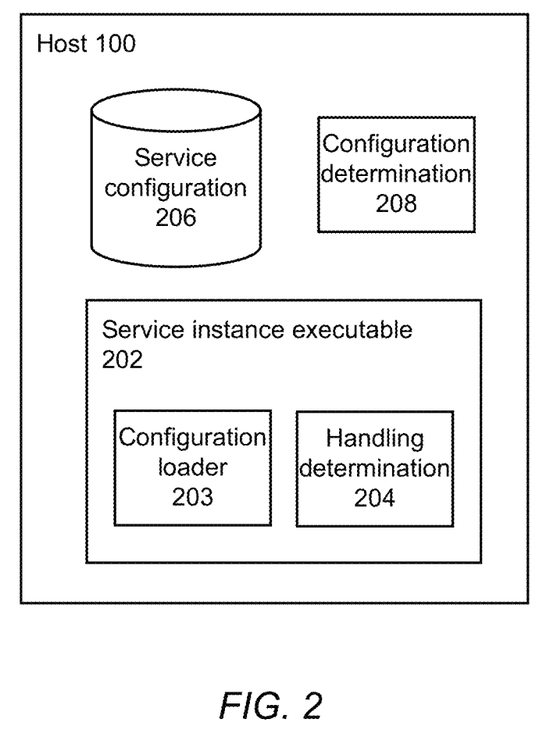
FIG. 2 is a high-level block diagram illustrating a detailed view of a host and an executable for a service instance, according to one embodiment.

FIG. 2 is a high-level block diagram illustrating a detailed view of a host 100 and an executable for a service instance, according to one embodiment.

A service instance executable 202 comprises the code that when executed by the operating system of a host 100 acts as the instance of the service (either a current instance 102 or an updated instance 103) on that host. The service instance executable 202 performs the primary operations that carry out the service, such as matching buy and sell orders for a real-time stock trading service, or saving current vehicle location for a real-time transportation location update service.

The service instance executable 202 additionally comprises components that allow it to determine whether or not handle a particular client request. For example, a handling determination module 204 reads the listed data timestamp of a particular client request (e.g., from the IP packet embodying the request) and compares it to the offset time t, determining whether or not to handle the client request based on the comparison. The logic for the handling determination module 204 may differ somewhat for different service instances. For example, the handling determination module 204 for a current service instance 102 determines that a given client request should be handled if the listed data timestamp of the client request is less than (and/or equal to) the handoff time t. In contrast, the handling determination module 204 for an updated service instance 103 determines that a given client request should be handled if the listed data timestamp of the client request is greater than (and/or equal to) the handoff time t.

In some embodiments, the handling determination module 204 of a service instance executable 202 may use other criteria, in addition to the comparison of a client request's listed data timestamp and the handoff time t, in determining whether or not to handle the client request. For example, as described in more detail later below, the handling determination modules 204 could be used to achieve load balancing without the use of separate load balancer hardware or software by deciding whether or not to handle a client request based on additional criteria, such as sending location.

In some embodiments, the service instance executable includes a configuration loader 203 that dynamically loads data (such as parameter values, or code) that allow the handling determination module 204 to determine whether or not to handle a given client request. In such embodiments, the host 100 may include a service configuration repository 206 that has the data to be loaded by the configuration loader. Using the configuration loader 203 and the service configuration repository 206, the same service instance executable 202 may be used to dynamically configure behavior of service instances at runtime, such as the particular handoff time t at which they will stop (or start) handling client requests, and/or the time $t_2$ at which the current service instances 102 will be stopped.

In some embodiments, the host 100 includes a configuration determination module 208 that computes the particular data stored in the service configuration repository 206. For example, in one embodiment the configuration determination module 208 computes the parameters t and/or t2 for different services based on prior measurements. For instance, the configuration determination module 208 can compute t for a given service by measuring how long it typically takes the service instance executable 202 for the updated service instances 103 for that service to start (e.g., an average time); the configuration determination module 208 then allots at least that amount of time to t (e.g., computes t by adding at least that amount of time to a time at which the updated service instances 103 were started), since the updated service instances 103 should all have started before the handoff to them from the current service instances 102. As another example, the configuration determination module 208 can compute $t_2$ for a given service by measuring the variance in packet arrival times for that particular service. Thus, during some initial time period, the configuration determination module 208 for a host 100 could track the differences between the listed data timestamp of client requests and the times at which they arrived at the host 100 and, at the end of the time period, compute their variances. The configuration determination module 208 then computes $t_2$ as a function of the computed variance (e.g., so that the time difference $|t_2-t|$ sufficiently large that at least P percent of client request packets sent at time t will arrive before time $t_2$, for some value P). This computation of $t_2$ allows achieving a given degree of confidence that client request packets will not arrive after the current service instances 102 hand off the request handling to the updated service instances 103. The configuration determination module 208 then stores the computed t and/or $t_2$ in the service configuration repository 206, to be used in future when configuring instances for that service. Since different services may have different data timing characteristics, the service configuration repository 206 may contain different data for different services.

Figure 3:
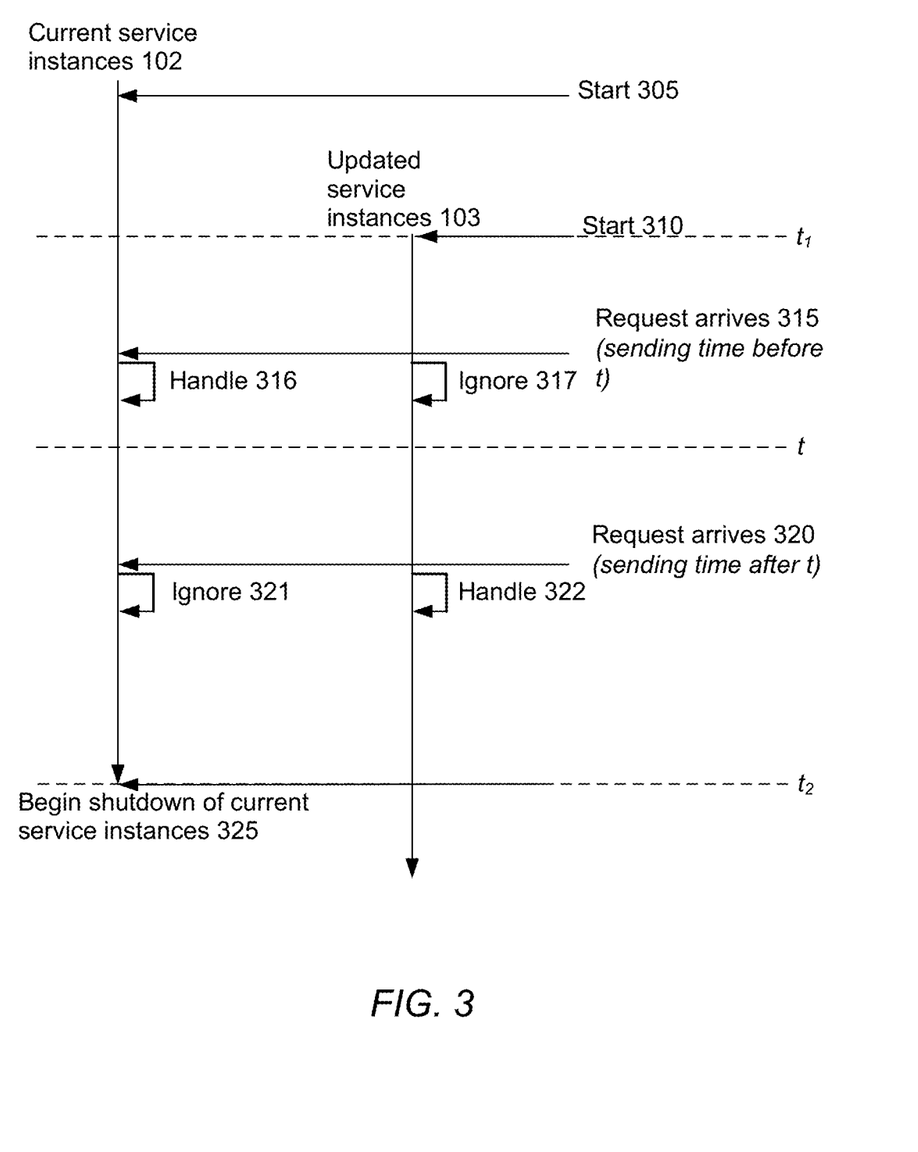
FIG. 3 illustrates the timeline associated with the handoff between a current service instance 102 and an updated service instance 103 on a host, according to one embodiment.

FIG. 3 illustrates the timeline associated with the handoff between a current service instance 102 and an updated service instance 103 on a host 100, according to one embodiment.

At some initial time, the current service instance 102 was started 305 on the host 100. At some later time, the current service instance 102 is updated (e.g., to fix bugs, improve performance, or add or modify features, etc.). At time $t_1$, the updated service instance 103 is started 310 on the host 100. After the updated service instance 103 has started 310 and has been coordinated with the other updated service instances 103 on other hosts 100, so that it is ready to service client requests, two separate instances are available to service client requests on the host 100: the current service instance 102 and the updated service instance 103. Until a handoff time t (as specified in the listed data timestamp of client request packets), the current service instance 102 handles client requests; after t, the updated service instance 103 handles the client requests. More specifically, to make the determination of whether to handle a given client request, the handling determination module 204 of the various service instances compares t with the listed data timestamp of the client request's packet. For client request packets with listed data timestamps before t, the current service instance 102 handles 316 the packets and the updated service instance 103 ignores 317 the packets; for client request packets with listed data timestamps after t, the current service instance 102 ignores 321 the packets and the updated service instance 103 handles 322 the packets.

At time $t_2$ on the host 100, the current service instance 102 begins 325 shutdown. In one embodiment, code of the current service instance itself monitors the current time of the clock on the host 100, and after $t_2$ initiates its own shutdown. Since time $t_2$ was computed so that it is statistically unlikely that packets sent by a client device 120 on or before a time t (as reported by the clock of the client device 120) will arrive after $t_2$ (as reported by the clock of the host 100), it is probable that for all packets, a service instance will be available to handle them.

FIG. 4 (divided between FIGS. 4A and 4B) illustrates data for one specific example, in which a real-time transportation location update service receives client requests to log the current trip location.

A first host 400A runs a first service instance 402A, and a second host 400B runs a second service instance 402B. The handoff time has been set (e.g., by the configuration determination module 208, and/or based on a value in the service configuration repository 206) to 1:00:16 AM, after which the service instance 402A will stop processing client requests, and the service instance 402B will start processing the client requests. Thus, at times after the receipt of the client requests in row 9—which represents receipt of request at the "real" global time 1:00:16 AM—the service instance 402B will typically process the new received packets. However, at rows 12, 15, and 17, "straggler" packets arrive with listed data timestamps before the handoff time of 1:00:16 AM, as respectively indicated by the values "1:00:14 AM", "1:00:15 AM", and "1:00:11 AM" in the "timestamp" column. Since these listed data packet times are on or before the handoff time of 1:00:16 AM, the first service instance 402A will process the corresponding client requests, even though the actual time of receipt of the packets at the first host 400A is after the handoff time.

By time $t_2$ (1:00:35 AM, the time at which the first service instance 402A stops processing client requests), no more packets are arriving with listed data timestamps before the handoff time, so no packets fail to be processed. Notice that the maximum variance for the first service instance 402A is 6, and for the second service instance 402B is 7, so the time window $|t_2-=|1:00:35\ AM-1:00:16\ AM|=19$ seconds is significantly larger than the maximum variance of either service instance, which makes it highly unlikely that "straggler" packets with high delay variance will arrive after the handoff period and thus fail to be processed.

Figure 5:
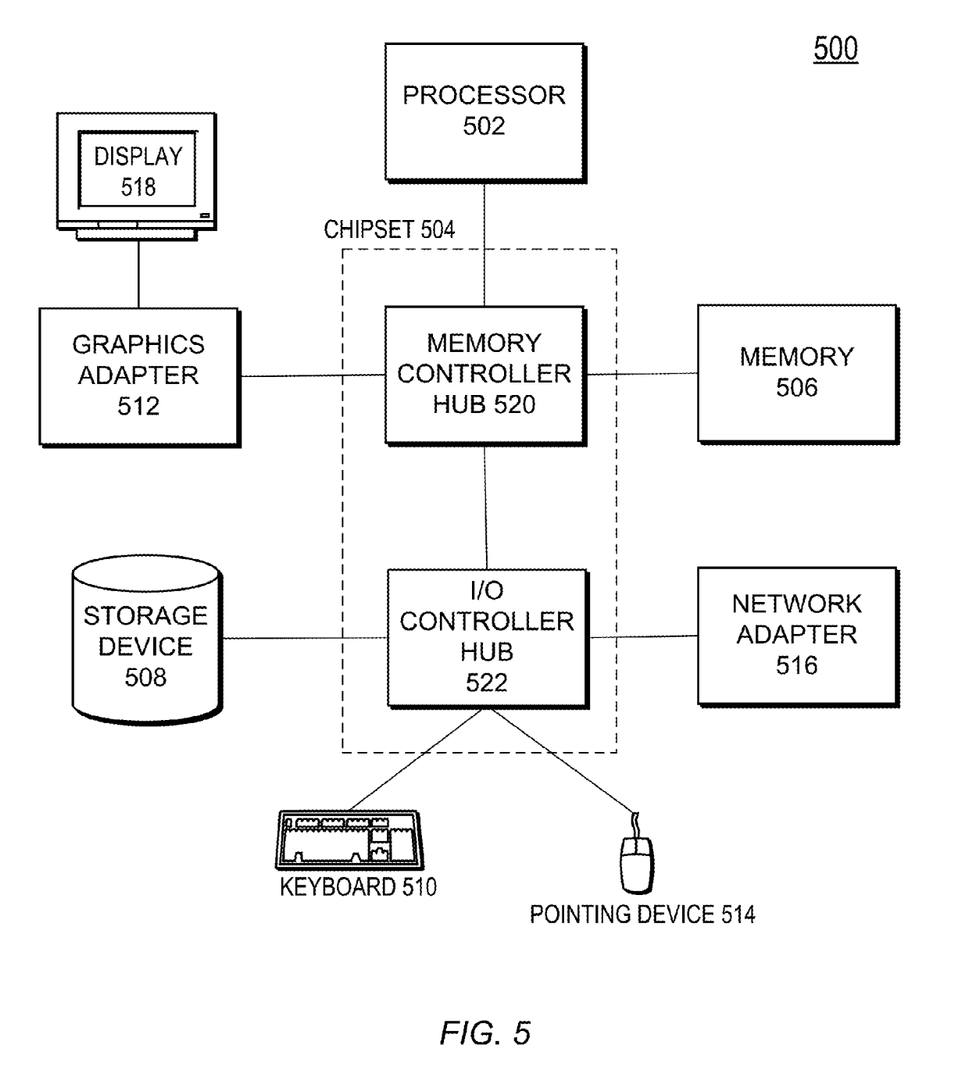
FIG. 5 is a high-level block diagram illustrating physical components of a computer used as part or all of the hosts or client device from FIG. 1, according to one embodiment.

FIG. 5 is a high-level block diagram illustrating physical components of a computer 500 used as part or all of the hosts 100 or client device 120 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 such as a host or smartphone may lack a graphics adapter 512, and/or display 518, as well as a keyboard or external pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Embodiments

The foregoing has described embodiments for handing off request processing to an updated version of a service, in which current service instances stop processing client requests, and updated service instances begin processing them, after a handoff time t. However, other variations are possible in different embodiments. For example, in some embodiments the criteria for deciding whether a given service instance should handle a client request include—in addition to the data timestamps of the client request packets—some other property of the client requests—such as the location from which the requests were sent. Setting the handling criterion based on some detected property of the client requests may be achieved by (a) the host(s) 100 detecting an abnormality in the client requests with respect to some property (e.g., an unusual amount of requests being sent from a particular location), and (b) setting the handoff criterion that the handling determination modules 204 of the service instances will use (e.g. by writing new values into the service configuration repository 206 and then triggering the configuration loaders 203 of the service instances to execute and load the new values for evaluation by the handoff determination modules 204).

For example, location-based load balancing—without the use of a separate load balancer software or hardware component—can be achieved by the handling determination modules 204 of the service instances using the client request sending location as the criterion for determining whether or not to handle a given client request. For instance, an analysis component of one of the hosts 100 could detect that an unusually large number of the client requests are being sent from San Francisco. The analysis component could then set the handoff criteria as follows: before handoff time t, a first service instance A processes client requests from New York and San Francisco, while a second service instance B processes client requests from Seattle; after time t, service A processes client requests from New York only, while service B will handle client requests both from San Francisco and Seattle. This accomplishes hot-swapped data processing of San Francisco from service instance A to service instance B, which is helpful if the volume of client requests in San Francisco becomes too large and it would be advantageous to divert the flow from service instance A to service instance B.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for updating a real-time distributed service distributed across a plurality of hosts, the computer-implemented method comprising:
   running a plurality of current instances of the real-time distributed service on the plurality of hosts;
   running a plurality of updated instances of the real-time distributed service on the plurality of hosts;
   determining a time window during which the plurality of current instances will run concurrently with the plurality of updated instances;
   determining a handoff time within the time window;
   receiving a client request packet for the real-time distributed service from a client device over a computer network;
   the plurality of current instances and the plurality of updated instances comparing a data timestamp of the client request packet with the handoff time;
   responsive to the data timestamp being less than the handoff time, the plurality of current instances processing the client request packet;
   responsive to the data timestamp being greater than the handoff time, the plurality of updated instances processing the client request packet; and
   after an end of the time window, the plurality of current instances shutting down.

2. The computer-implemented method of claim 1, further comprising:
measuring an average time that it takes the real-time distributed service to become ready to handle client requests across a plurality of hosts; and
determining the handoff time based on the measured average time.

3. The computer-implemented method of claim 1, further comprising:
computing a variance of client request packet delivery times for the real-time distributed service; and
determining an end of the time window based on the computed variance.

4. The computer-implemented method of claim 3, further comprising:
computing a different variance of client request packet delivery times for a different service; and
determining an end of a time window for the different service based on the computed different variance.

5. The computer-implemented method of claim 1, further comprising:
the plurality of current instances and the plurality of second instances both evaluating a criterion based on an attribute of the client request packet other than the data timestamp.

6. The computer-implemented method of claim 5, wherein the criterion is a location from which the client request packet was sent, and wherein either the plurality of current instances or the plurality of updated instances handles the client request packet, based at least in part on the location.

7. A non-transitory computer-readable storage medium storing instructions executable by a computer processor, the instructions comprising:
instructions for running a first instance of a real-time distributed service;
instructions for determining a time window during which the first instance will run concurrently with a second instance of the real-time distributed service that is different from the first instance, and a handoff time within the time window;
instructions for running the second instance of the real-time distributed service during the time window;
instructions for receiving a client request packet from a client device over a computer network;
instructions for comparing, by the first instance and the second instance, a data timestamp of the client request packet with the handoff time; and
instructions for enabling the first instance to handle the client request packet based at least in part on the data timestamp of the client request packet being less than the handoff time, and for enabling the second instance to handle the client request packet based at least in part on the data timestamp of the client request packet being greater than the handoff time.

8. The non-transitory computer-readable storage medium of claim 7, further comprising:
instructions for measuring an average time that it takes the real-time distributed service to become ready to handle client requests across a plurality of hosts;
wherein the handoff time is determined based on the measured average time.

9. The non-transitory computer-readable storage medium of claim 7, further comprising:
instructions for computing a variance of client request packet delivery times for the real-time distributed service;
wherein an end of the time window is determined based on the computed variance.

10. The non-transitory computer-readable storage medium of claim 9, further comprising:
instructions for computing a different variance of client request packet delivery times for a different service; and
wherein an end of a time window for the different service is determined based on the computed different variance.

11. The non-transitory computer-readable storage medium of claim 7, further comprising:
instructions for the first instance and the second instance both evaluating a criterion based on an attribute of the client request packet other than the data timestamp.

12. The non-transitory computer-readable storage medium of claim 11, wherein the criterion is a location from which the client request packet was sent, and wherein exactly one of the first instance and the second instance handles the client request packet, based at least in part on the location.

13. The non-transitory computer-readable storage medium of claim 7, further comprising:
instructions for determining that an end of the time window has arrived; and
instructions for, responsive to determining that the end of the time window has arrived, shutting down the first instance.

14. A computer-implemented method comprising:
running a first instance of a real-time distributed service;
determining a time window during which the first instance will run concurrently with a second instance of the real-time distributed service that is different from the first instance, and a handoff time within the time window;
running the second instance of the real-time distributed service during the time window;
receiving a client request packet from a client device over a computer network;
comparing a data timestamp of the client request packet with the handoff time; and
enabling the first instance to handle the client request packet based at least in part on the data timestamp of the client request packet being less than the handoff time, and for enabling the second instance to handle the client request packet based at least in part on the data timestamp of the client request packet being greater than the handoff time.

15. The computer-implemented method of claim 14, further comprising:
measuring an average time that it takes the real-time distributed service to become ready to handle client requests across a plurality of hosts; and
wherein the handoff time is determined based on the measured average time.

16. The computer-implemented method of claim 14, further comprising:
computing a variance of client request packet delivery times for the real-time distributed service; and
wherein an end of the time window is determined based on the computed variance.

17. The computer-implemented method of claim 16, further comprising:
computing a different variance of client request packet delivery times for a different service; and wherein an end of a time window for the different service is determined based on the computed different variance.

18. The computer-implemented method of claim 14, further comprising:

evaluating, by at least one of the first instance or the second instance, a criterion based on an attribute of the client request packet other than the data timestamp.

19. The computer-implemented method of claim 18, wherein the criterion is a location from which the client request packet was sent, and wherein either the first instance or the second instance handles the client request packet based, at least in part, on the location.

20. The computer-implemented method of claim 14, further comprising:

determining that an end of the time window has arrived; and responsive to determining that the end of the time window has arrived, shutting down the first instance.

* * * * *